United States Patent
Eizenga et al.

(10) Patent No.: US 10,526,545 B2
(45) Date of Patent: Jan. 7, 2020

(54) PROCESSES FOR STRIPPING CONTAMINANTS FROM MULTIPLE EFFLUENT STREAMS

(71) Applicant: UOP LLC, Des Plaines, IL (US)

(72) Inventors: Donald A. Eizenga, Elk Grove Village, IL (US); Xin X. Zhu, Long Grove, IL (US); Richard K. Hoehn, Mount Prospect, IL (US); Paul C. Steacy, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 135 days.

(21) Appl. No.: 15/685,587

(22) Filed: Aug. 24, 2017

(65) Prior Publication Data

US 2018/0119023 A1    May 3, 2018

Related U.S. Application Data

(60) Provisional application No. 62/414,623, filed on Oct. 28, 2016.

(51) Int. Cl.

| C10G 7/00 | (2006.01) |
| C10G 61/02 | (2006.01) |
| B01D 3/14 | (2006.01) |
| B01D 5/00 | (2006.01) |
| B01D 3/34 | (2006.01) |

(52) U.S. Cl.
CPC .............. *C10G 7/00* (2013.01); *B01D 3/143* (2013.01); *B01D 3/343* (2013.01); *B01D 5/006* (2013.01); *C10G 61/02* (2013.01); *C10G 2300/1044* (2013.01); *C10G 2300/1055* (2013.01)

(58) Field of Classification Search
CPC ........................................................ C10G 7/00
See application file for complete search history.

(56) References Cited

U.S. PATENT DOCUMENTS

| 2,998,381 | A | * | 8/1961 | Bushnell | ................ C10G 65/16 |
| | | | | | 208/210 |
| 4,116,816 | A | * | 9/1978 | Davis | ..................... C10G 65/16 |
| | | | | | 208/209 |
| 8,608,947 | B2 | | 12/2013 | Petri et al. | |
| 8,715,596 | B2 | | 5/2014 | Hoehn et al. | |
| 8,852,404 | B2 | | 10/2014 | Hoehn et al. | |
| 8,999,150 | B2 | * | 4/2015 | Hoehn | ................... C10G 49/22 |
| | | | | | 208/208 R |
| 2013/0045140 | A1 | * | 2/2013 | Hoehn | ................... C10G 53/00 |
| | | | | | 422/187 |
| 2014/0262946 | A1 | | 9/2014 | Zhu et al. | |

OTHER PUBLICATIONS

Salvatore J. Rand, ed., Significance of Tests for Petroleum Products, 8th edition (2010), p. 88.*
Search Report dated Dec. 21, 2017 for corresponding PCT Appl. No. PCT/US2017/052475.

* cited by examiner

*Primary Examiner* — Randy Boyer
(74) *Attorney, Agent, or Firm* — Paschall & Maas Law Office, LLC; James C. Paschall

(57) ABSTRACT

Processes for combining the stripping sections for two different reaction zones, such as a diesel hydrotreating zone and a naphtha hydrotreating zone. The stripping section includes an air cooler, a combined overhead receiver and two different separation sections. The two separation sections may be in the same column, but be fluidically separated. Alternatively the two sections may be in different columns. A stream from the second section may be used as a reflux from the first. While a stream from the combined overhead condenser may provide a reflux for the first section.

8 Claims, 4 Drawing Sheets

PROCESSES FOR STRIPPING CONTAMINANTS FROM MULTIPLE EFFLUENT STREAMS

CROSS-REFERENCE TO RELATED APPLICATION

This application claims priority from Provisional Application No. 62/414,623 filed Oct. 28, 2016, the contents of which cited application are hereby incorporated by reference in its entirety.

FIELD OF THE INVENTION

This invention relates generally to processes for recovering effluent streams from hydroprocessing, and more particularly to processes for stripping contaminants from multiple effluent streams before the streams are recovered and processed further.

BACKGROUND OF THE INVENTION

Hydroprocessing includes processes which convert hydrocarbons in the presence of hydroprocessing catalyst and hydrogen to more valuable products. Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst. Slurry hydrocracking is a slurried catalytic process used to crack residue feeds to gas oils and fuels.

Hydrotreating is another hydroprocessing process used to remove heteroatoms such as sulfur and nitrogen from hydrocarbon streams to meet fuel specifications and to saturate olefinic compounds. Hydrotreating can be performed at high or low pressures, but is typically operated at lower pressure than hydrocracking. Due to environmental concerns and newly enacted rules and regulations, saleable fuels must meet lower and lower limits on contaminates, such as sulfur and nitrogen. New regulations require essentially complete removal of sulfur from diesel. For example, the ultra-low sulfur diesel (ULSD) requirement is typically less than about 10 wppm sulfur.

A typical refinery configuration comprises multiple separate hydrotreatment units for sulfur removal from different streams such as naphtha, distillate, and heavy residual oil (where required). Hydrocracking is often included in the configurations to upgrade heavier, low value products into distillate and lighter products. Often a naphtha hydrotreating unit is a low cost unit requiring relatively low pressure conditions. In contrast, distillate hydrotreating unit requires higher pressure, while a hydrotreating or hydrocracking unit for a heavy residual oil would require even higher pressures. The separation of the reactor sections for the different hydrotreating units is often the optimal economic solution based on equipment operational cost savings (e.g., processing each stream at minimum pressure).

All hydroprocessing units typically utilize a relatively low pressure (i.e., between 100-150 psig) stripping of hydrogen sulfide from the hydroprocessed effluent. Optimum stripping of naphtha involves re-boiling of the naphtha either with a fired heater or a heat exchanger to remove LPG (C4-hydrocarbons). Optimum stripping of heavier oils to remove naphtha and lighter typically uses steam stripping to minimize capital and operating costs (e.g., by elimination of the heater) and to prevent coking from high pressure re-boiling or off gas compression requirements for low pressure re-boiled stripping. In addition, simple combination of two effluent streams would require rigorous fractionation of naphtha from diesel or heavier oils in addition to stripping which is both capital and energy intensive. Thus, due to the different stripping processes and product requirements, the two stripping sections cannot merely be combined.

However, it is believed that a process for stripping multiple effluent streams is desirable because if the stripping sections of a naphtha hydrotreating unit and a diesel hydrotreating unit were combined, less equipment and plot space would be utilized. Therefore, the present invention seeks to address the problems associated with combining the stripping sections for two different hydroprocessing units.

SUMMARY OF THE INVENTION

One or more processes have been invented which allow for the stripping sections of two different hydrotreating units to be combined. By combining the stripping sections, the equipment count and, accordingly, the installed cost of refinery hydroprocessing units, may be reduced without introducing inefficiency in the fractionation, but to synergistically combine the operations. The various embodiments of the present invention may be applied when considering a modular refinery implementation for small capacity units. This combined unit could also make modular construction simpler. Alternatively, the combined unit may be applied in a larger refinery with the objective of minimizing equipment count and installed costs.

In a first aspect of the present invention, the present invention may be characterized broadly as providing a process for separating effluent streams from different reaction zones by: passing at least a portion of a first liquid effluent stream from a first reaction zone to a first separation zone; passing at least a second portion of a second liquid effluent stream from a second reaction zone to a second separation zone, the second reaction zone being different than the first reaction zone; separating the portion of a first effluent stream in the first separation zone into an overhead stream and a bottoms stream; separating the portion of a second effluent stream in the second separation zone into an overhead stream and a bottoms stream; passing both the overhead stream from the second separation zone and the overhead stream from the first separation zone to a combined overhead receiver; and, providing a reflux stream for at least the second separation zone from the combined overhead receiver.

In at least one embodiment of the present invention, the bottoms stream from the first separation zone comprises a diesel stream. It is contemplated that the process includes passing both the overhead stream from the second separation zone and the overhead stream from the first separation zone to a combined overhead condenser. It is also contemplated that the first separation zone receives a stripping gas stream.

In at least one embodiment of the present invention, the first reaction zone comprises a diesel hydrotreating zone, and wherein the second reaction zone comprises a naphtha hydrotreating zone. It is contemplated that the process includes passing a reflux stream from the second separation zone to the first separation zone. It is further contemplated that the first separation zone and the second separation zone are each contained within different vessels. It is also contemplated that the first separation zone and the second separation zone are each contained within the vessel and wherein the vessel comprises a wall fluidically separating the first separation zone and the second separation zone. The second separation zone may be heated with a reboiler, and the first separation zone may receive a stripping gas comprising, for example, steam.

In a second aspect of the present invention, the present invention may be generally characterized as providing a process for separating effluent streams from different reaction zones by: passing at least a portion of a first liquid effluent stream from a first reaction zone to a first separation zone, the portion of the first liquid effluent stream comprising a diesel hydrotreated effluent; passing at least a second portion of a second liquid effluent stream from a second reaction zone to a second separation zone, the portion of the second liquid effluent stream comprising a naphtha hydrotreated effluent; separating the first liquid effluent stream in the first separation zone into an overhead stream and a bottoms stream; separating the second liquid effluent stream in the second separation zone into an overhead stream and a bottoms stream; passing both the overhead stream from the second separation zone and the overhead stream from the first separation zone to a combined overhead condenser; and, passing a condensed overhead stream from the combined overhead condenser to a combined overhead receiver.

In at least one embodiment of the present invention, the process includes passing a reflux stream from the overhead receiver to the second separation zone. The process may include passing a steam stream into the first separation zone. It is contemplated that the process also includes passing the bottoms stream from the first separation zone to a drying zone configured to provide a diesel product stream. It is contemplated that the process includes passing a stream from the second separation zone to the first separation zone as a reflux stream.

In at least one embodiment of the present invention, the first separation zone and the second separation zone are each contained within different vessels.

In at least one embodiment of the present invention, the first separation zone and the second separation zone are each contained within a vessel and wherein the vessel comprises a wall fluidically separating the first separation zone and the second separation zone.

In a third aspect of the present invention, the present invention may be characterized as providing a process for separating effluent streams from different reaction zones by: passing at least a portion of a first liquid effluent stream from a first reaction zone to a first separation zone, the portion of the first liquid effluent stream comprising a diesel hydrotreated effluent; passing at least a second portion of a second liquid effluent stream from a second reaction zone to a second separation zone, the portion of the second liquid effluent stream comprising a naphtha hydrotreated effluent; separating the portion of a first effluent stream in the first separation zone into an overhead stream and a bottoms stream; separating the portion of a second effluent stream in the second separation zone into an overhead stream and a bottoms stream; passing both the overhead stream from the second separation zone and the overhead stream from the first separation zone to a combined overhead receiver; and, passing a reflux stream from the second separation zone to the first separation zone.

In at least one embodiment of the present invention, the second separation zone is heated with a reboiler. It is contemplated that the process includes passing a steam stream into the first separation zone.

In at least one embodiment of the present invention, the first separation zone comprises a stripping column and the second separation zone comprises a stripping column.

In at least one embodiment of the present invention, the process includes passing the naphtha hydrotreated effluent to a naphtha splitter or a reforming reactor, wherein the naphtha hydrotreated effluent does not pass through any other fractionation when passed from the stripper and to the naphtha splitter or the reforming reactor.

In at least one embodiment of the present invention, the diesel hydrotreated effluent is capable of being passed to a blending pool without further fractionation.

Additional aspects, embodiments, and details of the invention, all of which may be combinable in any manner, are set forth in the following detailed description of the invention.

BRIEF DESCRIPTION OF THE DRAWINGS

One or more exemplary embodiments of the present invention will be described below in conjunction with the following drawing figures, in which.

DETAILED DESCRIPTION OF THE INVENTION

As mentioned above, processes have been invented for combining the strippers of two different hydrotreating units. As mentioned above, due to the different processing conditions and product requirements in the different hydrotreating units, in most cases the stripping sections cannot merely be combined. Accordingly, the present invention provides processes in which two different hydrotreating units having different operating conditions and receiving different feeds produce two effluent streams. The effluent streams are sent to separate separation zones. The separation zones share an overhead condenser and receiver and provide separate bottoms streams. The heavier fraction, such as a distillate stream, is able to use steam stripping configuration, while the lighter fraction, such as a naphtha stream is able to use re-boiling configuration. To avoid water dew point issues from a simple column combination, hot reflux from the lighter side is used for stripping in the heavier side. While the stripping sections may comprise separation fractionation columns, the stripping sections may comprise two portions of the same fractionation column. In either configuration, the stripping can be effectively achieved with less equipment.

With these general principles in mind, one or more embodiments of the present invention will be described with the understanding that the following description is not intended to be limiting.

Figure 1:
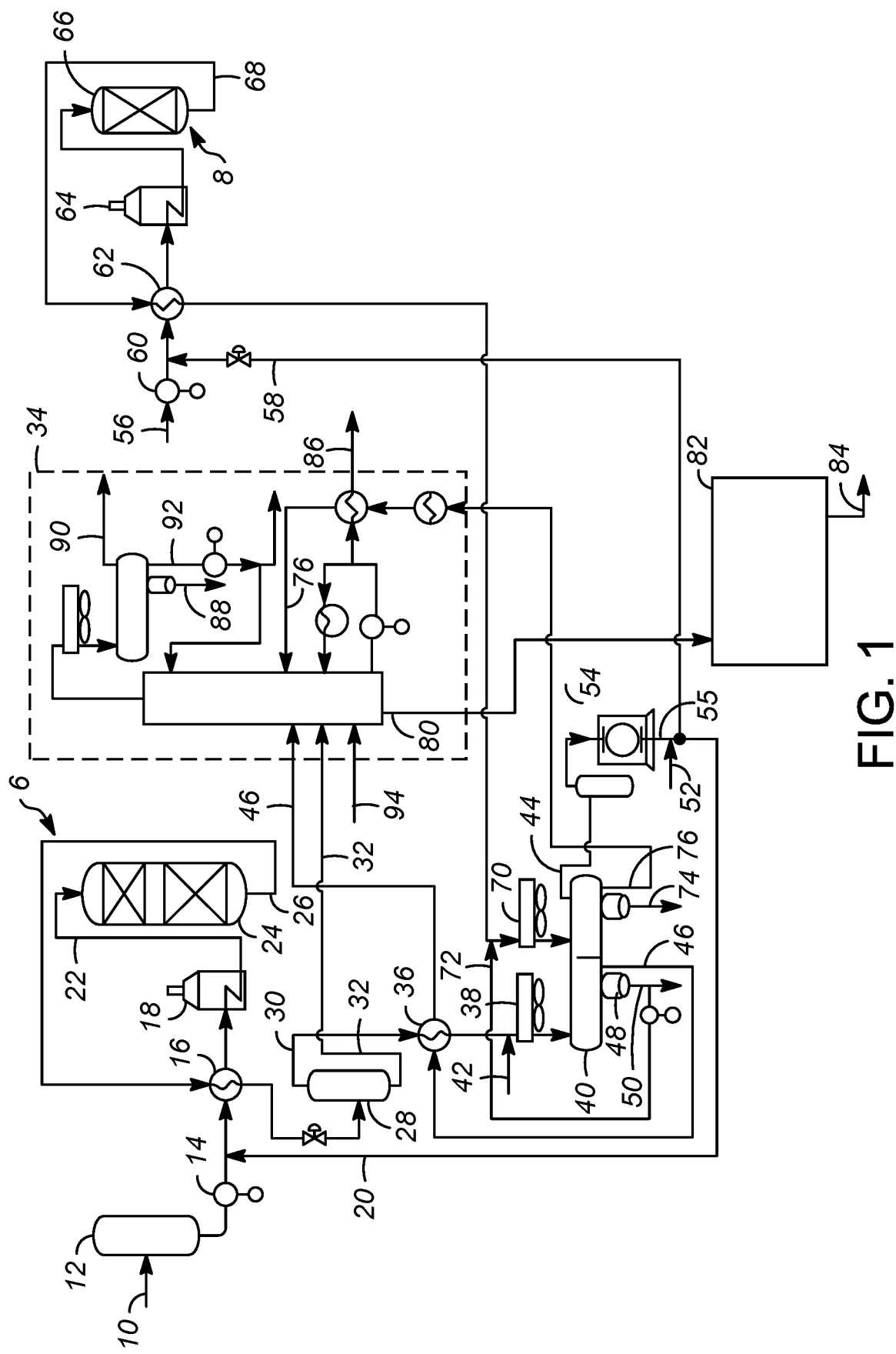
FIG. 1 shows an exemplary process flow diagram for a combined hydrotreating flow scheme that may be used in accordance with the present invention.

The various processes of the present invention involve combining the stripping associated with two effluents from two reaction zones 6, 8. As shown in FIG. 1, the two reactions zones 6, 8 may comprise a diesel hydrotreating reaction zone and a naphtha hydrotreating reaction zone. However, as discussed in at least one specific embodiment below, the present invention may be utilized with, for example, a diesel hydrotreating zone and a vacuum gas oil hydrocracking zone.

With reference to FIG. 1, a first feed stream 10 may be passed to a surge drum 12. From the surge drum 12, a pump 14 may pass the first feed stream 10 to a heat exchanger 16 to be heated and then to a charged heater 18. Prior to passing to the heat exchanger 16, the first feed stream 10 may be combined with a hydrogen containing gas 20 which may include a portion of a recycle gas stream (discussed below). A heated feed stream 22 may then be passed to the first reaction zone 6 having at least one reactor vessel 24.

As mentioned above, it is contemplated that the first reaction zone 6 may be a diesel hydrotreating zone. In such a case, the first feed stream 10 may comprise a diesel stream which has an initial boiling point between 121° C. (250° F.) and 288° C. (550° F.) and an end point of no more than 399° C. (750° F.). In the first reaction zone 6, the first feed stream 10 will be hydrotreated (and possibly hydrocracked) in the presence of hydrogen and a hydrotreating catalyst to provide a first effluent stream 26.

The diesel hydrotreating zone may comprise more than one reactor vessel 24, each with multiple beds of catalyst comprising a hydrotreating catalyst. Generally, in the reactor vessel 24 of the diesel hydrotreating zone, hydrocarbons with heteroatoms in the first feed stream 10 are further saturated, demetallized, desulfurized and/or denitrogenated. Although not depicted as such, hydrogen streams may be injected between or after catalyst beds in the reactor vessel 24 of the diesel hydrotreating zone to provide hydrogen requirements and/or to cool hydrotreated effluent. Suitable hydrotreating catalysts for use in the reactor vessel 24 of the diesel hydrotreating zone are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts. It is within the scope of the present invention that more than one type of hydrotreating catalyst be used in the same reactor vessel 24 of the diesel hydrotreating zone. Alternatively, more than one reactor vessel 24 can be used and the catalysts used in each reactor may be different. The Group VIII metal is typically present in an amount ranging from 2 to 20 wt %, preferably from 4 to 12 wt %. The Group VI metal will typically be present in an amount ranging from 1 to 25 wt %, preferably from 2 to 25 wt %. Noble metal catalysts in Group VIII of the Periodic Table may be useful catalysts in the diesel hydrotreating zone, such as for isomerizing to reduce pour or cloud point and saturating aromatics. Suitable metals are those of the group including platinum, palladium, rhodium, ruthenium, osmium and iridium. The Group VIII metal component may exist within the final composite as a compound such as an oxide, sulfide, halide, etc., or in an elemental state. Generally the amount of the noble metal component is small compared to the quantities of the other components combined therewith. Calculated on an elemental basis, the noble metal component generally comprises from 0.1 to 2.0 wt % of the final composite.

Exemplary hydrotreating reaction conditions in the diesel hydrotreating zone include a temperature from 290° C. (550° F.) to 455° C. (850° F.), suitably 316° C. (600° F.) to 427° C. (800° F.) and preferably 343° C. (650° F.) to 399° C. (750° F.), a pressure from 3.1 to 8.3 MPa (450 to 1200 psig), and preferably from 4.1 to 6.2 MPa (600 to 900 psig), a liquid hourly space velocity of the feed to the reactor vessel 24 of the diesel hydrotreating zone from 0.5 $hr^{-1}$ to 4 $hr^{-1}$, preferably from 1.0 to 2.0 $hr^{-1}$, and a hydrogen rate of 168 $Nm^3/m^3$ oil (1,000 scf/bbl) to 1,011 $Nm^3/m^3$ oil (6,000 scf/bbl), preferably 168 $Nm^3/m^3$ oil (1,000 scf/bbl) to 674 $Nm^3/m^3$ oil (4,000 scf/bbl). As will be appreciated, the conditions of the hydrotreating reaction may depend on the feed, for example, with a lower pressure being used for a straight run diesel from condensates, and a higher pressure being used for a heavy diesel or vacuum gas oil (VGO) feed.

The first effluent stream 26 may be cooled, for example by providing heat to the first feed stream 10 in the heat exchanger 16 (discussed above). After being cooled, the first effluent stream 26 may pass to a hot separator 28. The hot separator 28 separates the first effluent stream 26 to provide a vaporous hot separator overhead stream 30 and a liquid hot separator bottoms stream 32. The hot separator 28 is in downstream communication with the reactor vessel 24 of the diesel hydrotreating zone. The hot separator 28 may operate at about 177° C. (350° F.) to about 371° C. (700° F.) and preferably operates at about 232° C. (450° F.) to about 315° C. (600° F.). The hot separator 28 may be operated at a lower pressure than the reactor vessel 24 of the diesel hydrotreating zone accounting for pressure drop. For example, the hot separator 28 may be operated at pressures between about 2.8 to about 7.9 MPa (gauge) (400 to 1150 psig).

The liquid hot separator bottoms stream 32 may be passed to a stripping zone 34 (discussed below). The vaporous hot separator overhead stream 30 may be cooled in a heat exchanger 36, passed to an air cooler 38 and then introduced into a cold separator 40. As a consequence of the reactions taking place in the reactor vessel 24 of the diesel hydrotreating zone wherein nitrogen, chlorine and sulfur are removed from the feed, ammonia and hydrogen sulfide are formed. At a certain temperatures, ammonia and hydrogen sulfide will combine to form ammonium bisulfide and ammonia and chlorine will combine to form ammonium chloride. Both of these compounds have a characteristic sublimation temperature that may allow the compound to coat equipment, particularly heat exchange equipment, impairing the performance and causing the corrosion of said equipment. To prevent such deposition of ammonium bisulfide or ammonium chloride salts in various pieces of equipment a various lines, a suitable amount of a wash water 42 may be introduced into a line with vaporous hot separator overhead stream 30 upstream of where the temperature of the vaporous hot separator overhead stream 30 is lowered to about or below the characteristic sublimation temperature of either compound (i.e., the air cooler 38).

The cold separator 40 serves to separate hydrogen from hydrocarbons in the first effluent stream 26. The vaporous hot separator overhead stream 30 may be separated in the cold separator 40 to provide a vaporous cold separator stream 44 comprising a hydrogen-rich gas and a liquid cold separator bottoms stream 46 comprising a liquid effluent stream 46. The cold separator 40 is thus in downstream communication with the hot separator 28 and the reactor vessel 24 of the diesel hydrotreating zone. The cold separator 40 may be operated at about 100° F. (38° C.) to about 150° F. (66° C.), suitably about 115° F. (46° C.) to about 145° F. (63° C.), and just below the pressure of reactor vessel 24 of the diesel hydrotreating zone and the hot separator 28 accounting for pressure drop of intervening equipment to keep hydrogen and light gases in the overhead and normally liquid hydrocarbons in the bottoms. The cold separator may be operated at pressures between about 2.7 to 7.8 MPa (gauge) (385 to 1,135 psig). The cold separator 40 may also have a boot 48 for collecting an aqueous phase stream 50 (which may comprise sour water).

The hydrogen-rich gas stream in the vaporous cold separator stream 44 may be scrubbed in a scrubbing zone (not shown) depending on the levels of hydrogen sulfide and then, compressed in a compressor 54 to form a compressed hydrogen recycle stream 55, which may then be combined with a makeup or fresh hydrogen gas stream 52. The compressed hydrogen recycle stream 55, or at least a portion thereof, may be used as the hydrogen containing gas 20 combined with the first feed stream 10 discussed above. The liquid cold separator bottoms stream 46 may be passed to the stripping zone 34, which also receives an effluent stream from the reaction zone 8.

Thus, as shown in FIG. 1 a second feed stream 56 may be combined with a hydrogen containing gas stream 58 and, via a pump 60, heated in a heat exchanger 62 and then a charge heater 64. The hydrogen containing gas stream 58 may comprise a portion of the compressed hydrogen recycle stream 55 discussed above. After being heated, the second feed stream 56 is passed to the second reaction zone 8 having at least one reactor vessel 66.

In one aspect the second reaction zone 8 comprises a naphtha hydrotreating zone. In such embodiments, the second feed stream 56 may comprise straight run naphtha, or full range naphtha from fluid catalytic cracking operations, cracked naphtha obtained as a product of steam cracking, thermal cracking, visbreaking or delayed coking. The second feed stream 56 may comprise a naphtha stream which has an initial boiling point between 10° C. (50° F.) and 85° C. (185° F.) and an end point of no more than 230° C. (450° F.). Naphtha feedstocks normally contain organic nitrogen compounds and organic sulfur compounds. For example, some naphtha feedstocks typically contain from 0.1 to 4 wt %, total sulfur, substantially present in the form of organic sulfur compounds such as alkylbenzothiophenes. Such feedstocks may also contain from 50 ppm to 700 ppm of total nitrogen, substantially present in the form of organic nitrogen compounds such as non-basic aromatic compounds including carbazoles. A representative full range naphtha feedstock may contain 1 wt % sulfur, 500 ppm by weight of nitrogen, and greater than 70% by weight of 2-ring and multi-ring aromatic compounds. In contrast straight run naphtha is typically lower in sulfur, and nitrogen. As an example, a straight run naphtha may contain 8 ppm sulfur, 1 ppm nitrogen and approximately 6 wt % aromatic compounds. The present invention is applicable to all varieties of naphtha feed stocks.

In the reactor vessel 66 of the second reaction zone 8, the second feed stream 56 will be hydrotreated in the presence of hydrogen and a hydrotreating catalyst to provide a second effluent stream 68.

Preferred hydrotreating reaction conditions include a temperature from 260° C. (500° F.) to 455° C. (850° F.), suitably 316° C. (600° F.) to 427° C. (800° F.) and preferably 300° C. (572° F.) to 399° C. (750° F.), a pressure from 0.68 MPa (100 psig), preferably 1.34 MPa (200 psig), to 6.2 MPa (900 psig), a liquid hourly space velocity of the fresh hydrocarbonaceous feedstock from 1.0 $hr^{-1}$ to 10 $hr^{-1}$, preferably from 4.0 to 8.0 $hr^{-1}$, and a hydrogen rate of 34 to 505 $Nm^3/m^3$ hydrocarbon (200-3,000 scf/bbl), preferably 50 to 168 $Nm^3/m^3$ oil (300-1,000 scf/bbl).

Suitable hydrotreating catalysts for the second reaction zone 8 include those discussed above with respect to the first reaction zone 6. That portion of the above description is hereby incorporated by reference including the use of multiple reactors and multiple catalysts.

The second effluent stream 68 comprising a hydrotreated effluent may be used to heat the second feed stream 56 in the heat exchanger 62, and then be pass thorough an air cooler 70 before being passed into the cold separator 40. Although depicted as a combined cold separator 40, two separate vessels with two separate recycle gas compressors may be used. Again, a water wash stream 72 may be used with the second effluent stream 68, and a portion of the aqueous phase stream 50 (discussed above) may supply the water. Most of the hydrogen in the second effluent stream 68 will separate from the liquid portion may be recovered in the vaporous cold separator stream 44 (discussed above). A second sour water stream 74 may be removed from the cold separator 40 and processed as is known in the art. Finally, a liquid effluent stream 76 from the second reaction zone may be passed to the stripping zone 34.

In the stripping zone 34, the various streams of the effluents from the reaction zones 6, 8, in this case streams 32, 46, 76 can be stripped, utilizing some, if not all of the same equipment. As will be described in more detail below, the stripping zone 34 will provide a diesel stream 80 that may be passed to a drying zone 82 to provide a diesel product stream 84 which may be passed to a product blending pool (or processed further) without requiring further fractionation. Additionally, the stripping zone 34 will also provide a naphtha stream 86, which may be passed directly to a naphtha splitter (not shown) or a reforming reactor (not shown) without passing to a fractionation column first. Finally, the stripping zone 34 will also provide a sour water stream 88, an off gas stream 90 and an LPG stream 92. Due to various temperatures, operating pressures and compositions within the stripping zone 34, the present invention provides various solutions to the problems associated with an upper portion of a stripping column dropping below the water dew point and causing water to accumulate in the diesel or naphtha streams.

Figure 2:
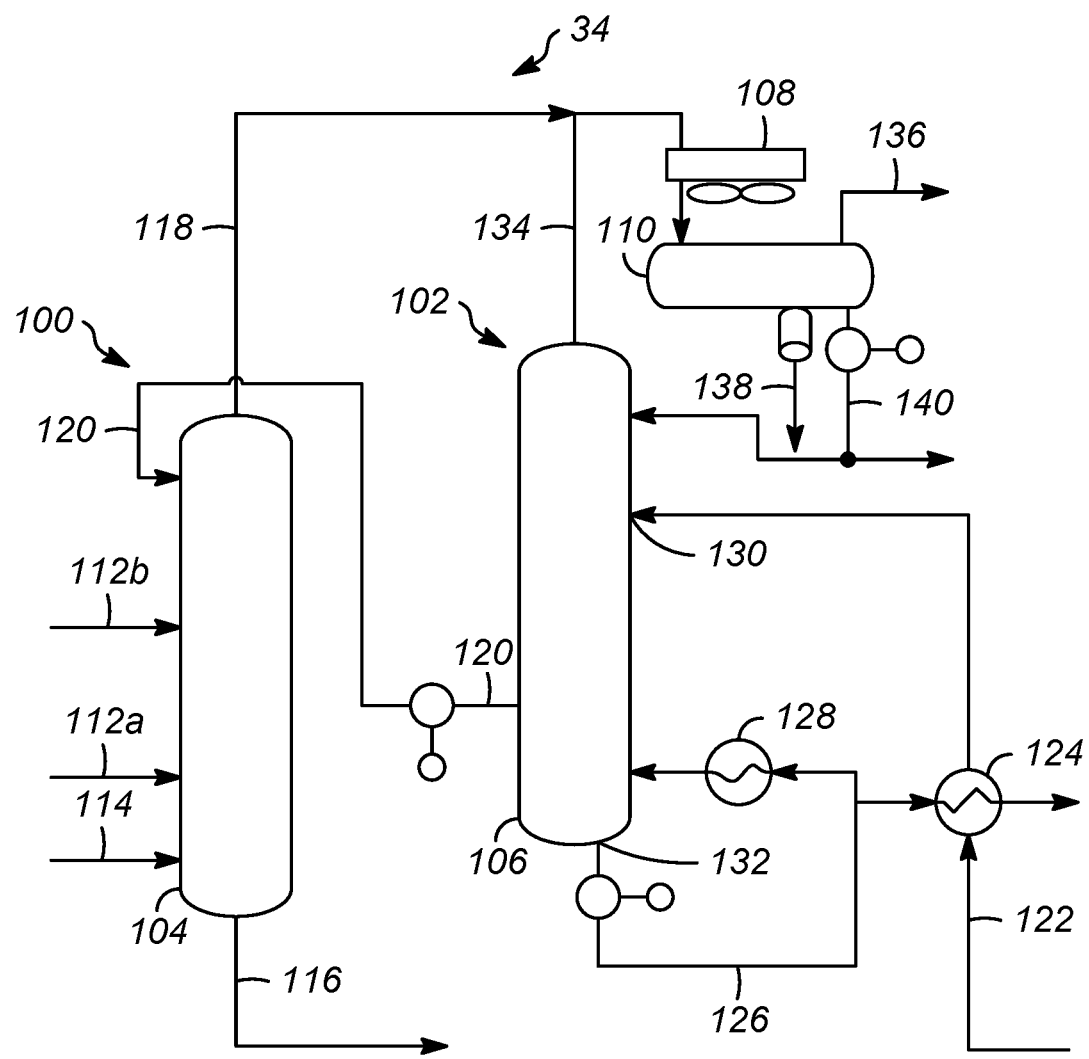
FIG. 2 shows a combined stripping section according to one or more embodiments of the present invention.

For example, with reference to FIG. 2, the stripping zone 34 comprises two separation zones 100, 102 each including a stripping column 104, 106. The stripping zone 34 also includes an air cooler 108 and a combined overhead receiver 110. The use of separate columns 104, 106 may be desired due to the simpler design and considering the columns 104, 106 likely operate at different temperatures.

As shown in FIG. 2, at least one effluent stream 112*a*, 112*b* from a first reaction zone, for example the diesel hydrotreating reaction zone from FIG. 1, may be passed to a first stripping column 104. As discussed above, the diesel hydrotreating reaction zone produces two effluent streams 46, 32, and thus the first stripping column 104 may receive two effluent streams 112*a*, 112*b* as shown in FIG. 2. Although not depicted as such, the streams 112*a*, 112*b* are preferably heated prior to entering the first stripping column 104. A stripping medium 114, for example steam, is introduced into the column 104 to separate the components of effluent streams 112*a*, 112*b* into a hot bottoms stream 116 and an overhead stream 118 comprising naphtha and lighter hydrocarbons, hydrogen, hydrogen sulfide, steam, and other gases. The hot bottoms stream 116 comprises the diesel stream 80. A reflux stream 120 passed to the first separation zone 100, and more particularly the first stripping column 104, comprises a stream from the stripping column 106 in the second separation zone 102.

The stripping column 106 in the second separation zone 102 receives at least one effluent stream 122 from a second reaction zone, for example the naphtha hydrotreating zone, discussed above. The effluent stream 122 from the second reaction zone may be heated in a heat exchanger 124 and then introduced into the second stripping column 106. A portion of a bottoms stream 126 from the column may be heated in a re-boiler 128 and passed back into the column to provide heat for the necessary stripping. Another portion of the bottoms stream 126 may heat the effluent stream 122 from the second reaction zone in the heat exchanger 124, and then be recovered, for example as the naphtha stream 86.

As mentioned above, the second separation zone 102 provides the reflux stream 120 for the first separation zone 100. The reflux stream 120 may be taken from the second separation zone 102 at a position on the second stripping column 106 between an inlet 130 for effluent stream 122 from the second reaction zone and an outlet 132 for the bottoms stream 126. The reflux stream 120 is used in the first separation zone to avoid the temperature dropping below the dew point.

An overhead stream 134 from the second stripping column 106 in the second separation zone 102 will include $C_{4-}$ hydrocarbons, hydrogen, hydrogen sulfide, and other gases. The overhead stream 134 may be combined with the overhead stream 118 from the first separation zone 100 and both passed to the air cooler 108 and then to the combined overhead receiver 110. It should be appreciated that this is merely preferred, and that the streams may each be passed to individual air coolers and then introduced apart or together to the combined overhead receiver 110.

In the overhead receiver 110 the overhead streams 118, 134 will separate and a gaseous stream 136, which may comprise hydrogen, hydrogen sulfide and other gases. This gaseous stream 136 may comprise the off gas stream 90 discussed above and may be recovered and processed further for example by being scrubbed to remove the hydrogen sulfide and used as a fuel gas in a fired heater or possibly recycled to one or both of the reaction zones (not shown). An aqueous stream 138 may also be recovered. The aqueous stream 138 may comprise the sour water stream 88 discussed above and processed further. A liquid hydrocarbon stream 140 from the combined overhead receiver 110 may comprise the LPG stream 92, discussed above, which may be recovered and processed further. Additionally, a portion of the liquid hydrocarbon stream 140 may be used as a reflux to the second separation zone 102.

Figure 3:
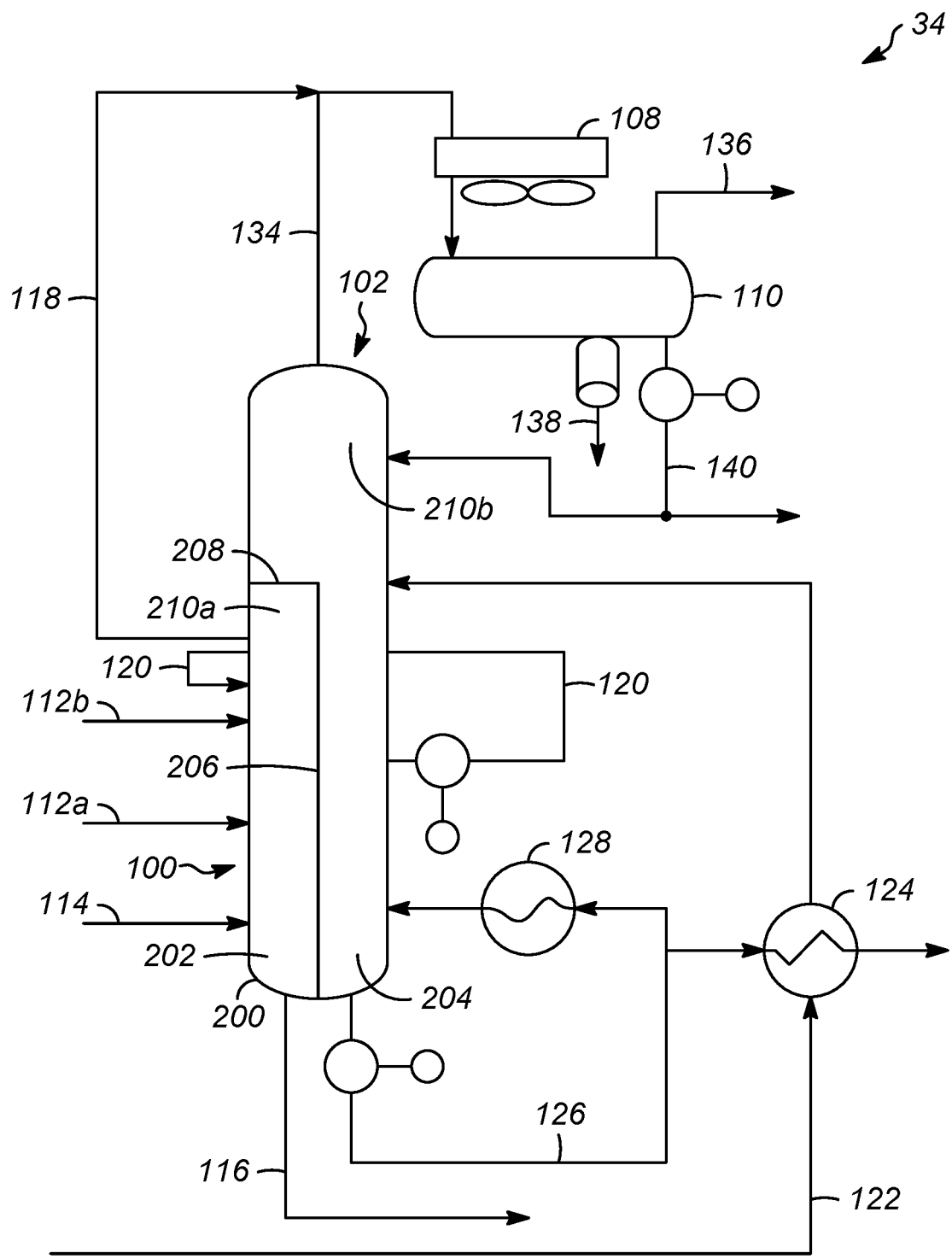
FIG. 3 shows another combined stripping section according to one or more embodiments of the present invention; and, FIG. 4 shows another combined stripping section according to one or more embodiments of the present invention.

Turning to FIG. 3, in various embodiments of the present invention the two separation zones 100, 102 in the stripping zone 34 comprise different portions of a single column 200. The single column 200 comprises two portions 202, 204 that are separated by a vertical wall 206 extending upwardly through the column 200 to separate the two portions 202, 204 fluidically. The wall 206 may be insulated to also thermally separate the portions 202, 204. A top tray 208 in one of the portions isolates an upper section 210a of the first portion 202 from an upper section 210b of the second portion 204. Apart from the combination of the two separate columns into a single column 200, the remaining portions of FIG. 3 are the same as FIG. 2. Such a design may be desirable based upon plot space, or in some applications, cost.

Figure 4:
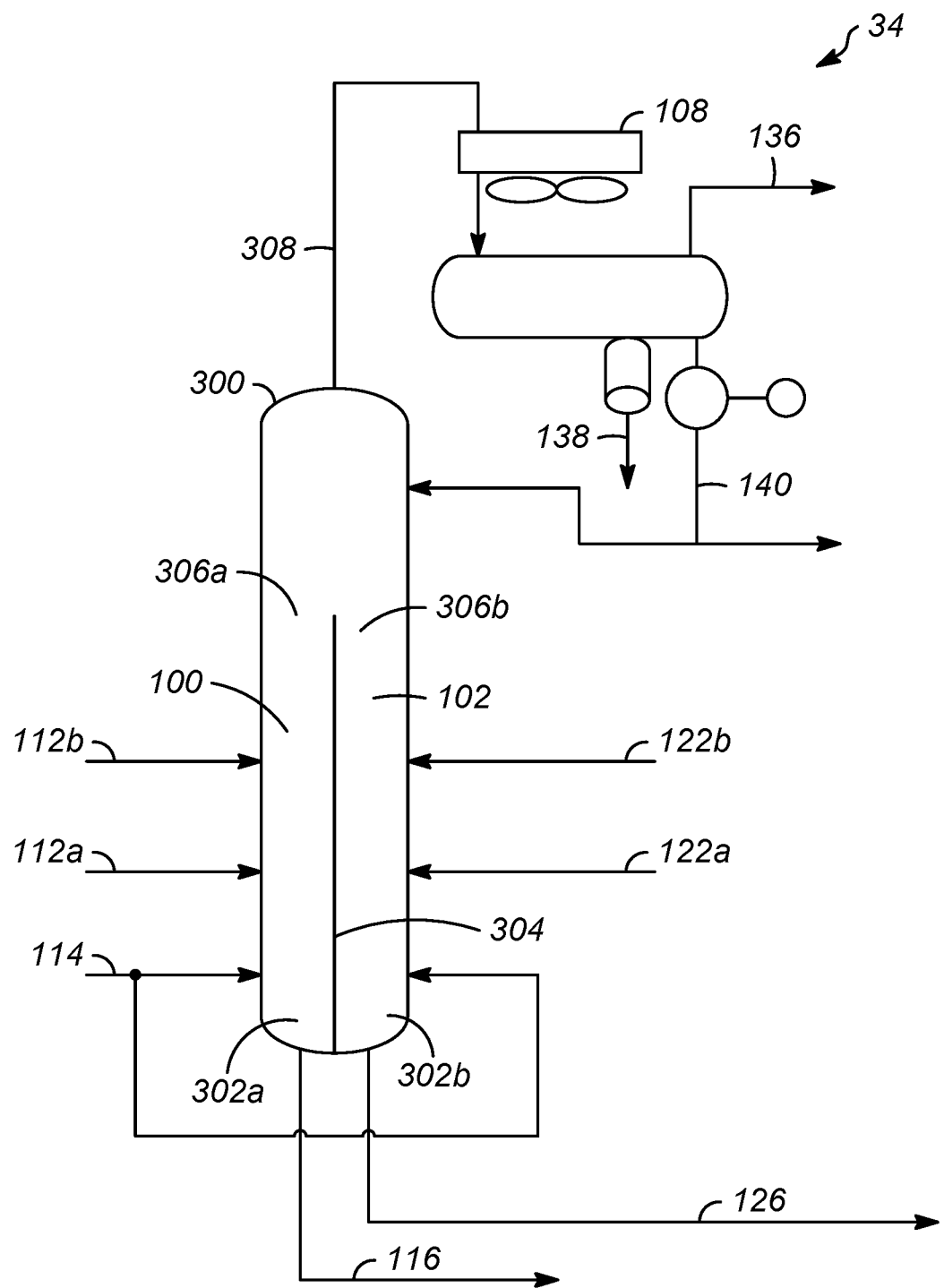

Turning to FIG. 4, in another embodiment the stripping zone 34 provides two separation zones 100, 102 within a single column 300, but in this embodiment, the bottoms 302a, 302b of the two separation zones 100, 102 are separated by a vertical wall 304. Tops 306a, 306b of both separation zones 100, 102 are in fluid communication. Such a design may be desirable when the effluent stream(s) 112a, 112b from the first reaction zone and 122a, 122b from the second reaction zone are both most efficiently stripped using steam stripping. This is contemplated, for example, when the effluent stream(s) 112a, 112b from the first reaction zone comprise diesel hydrotreated effluent streams and when the effluent stream(s) 122a, 122b from the second reaction zone comprise a hydrotreated or cracked VGO effluent. The overhead and top tray temperatures of the diesel and VGO effluents are much higher due to the stripping of naphtha overhead, thus, there is less chance that of a dew point problem associated with stripping a naphtha hydrotreated effluent. Furthermore, unlike the previous designs, both separation zones 100, 102 receive stripping medium 114, and both separation zones 100, 102 may be heated only by the effluent streams 112a, 112b, 122a, 122b entering the separation zones 100, 102—i.e., without re-boiling. Finally, in this embodiment, the column 300 provides single overhead stream 308 and the liquid hydrocarbon stream 140 from the combined overhead receiver 110 may comprise an unstabilized naphtha stream.

A modular refinery with a 14,000 BSPD full range naphtha hydrotreating unit and a 9,000 BPSD distillate hydrotreating unit was utilized as an exemplary case to demonstrate the principles of the present invention. Due to the relatively small capacity unit sizes, the cost of building such a configuration tends to be high on a per barrel basis especially due to high equipment installed cost factors. The fractionation section operating costs range between about 7% (for distillate) to 20%+(for naphtha) of the total unit cost. The various embodiments discussed above, are believed to save between 10-20% of fractionation capital costs with some operating costs savings as well. Accordingly, the exemplary case is believed to have an installed cost of $48 MM, which could be reduced to $46.5 MM ($1.5 MM or 3% savings overall). Thus, the combination of the two stripping sections, made possible by the various processes of the present invention, would provide a savings and still effectively and efficiently allow for the separation of the products.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

SPECIFIC EMBODIMENTS

While the following is described in conjunction with specific embodiments, it will be understood that this description is intended to illustrate and not limit the scope of the preceding description and the appended claims.

A first embodiment of the invention is a process for separating effluent streams from different reaction zones, the process comprising passing at least a portion of a first liquid effluent stream from a first reaction zone to a first separation zone; passing at least a second portion of a second liquid effluent stream from a second reaction zone to a second separation zone, the second reaction zone being different than the first reaction zone; separating the portion of a first effluent stream in the first separation zone into an overhead stream and a bottoms stream; separating the portion of a second effluent stream in the second separation zone into an overhead stream and a bottoms stream; passing both the overhead stream from the second separation zone and the overhead stream from the first separation zone to a combined overhead receiver; and, providing a reflux stream for at least the second separation zone from the combined overhead receiver. An embodiment of the invention is one, any or all of prior embodiments in this paragraph up through the first embodiment in this paragraph wherein the bottoms stream from the first separation zone comprises a diesel stream. An embodiment of the invention is one, any or all of prior embodiments in this paragraph up through the first embodiment in this paragraph further comprising passing both the overhead stream from the second separation zone and the overhead stream from the first separation zone to a combined overhead condenser. An embodiment of the invention is one, any or all of prior embodiments in this paragraph up through the first embodiment in this paragraph wherein the first separation zone receives a stripping gas stream. An embodiment of the invention is one, any or all of prior embodiments in this paragraph up through the first embodiment in this paragraph wherein the first reaction zone comprises a diesel hydrotreating zone, and wherein the second reaction zone comprises a naphtha hydrotreating zone. An embodiment of the invention is one, any or all of prior embodiments in this paragraph up through the first embodiment in this paragraph further comprising passing a reflux stream from the second separation zone to the first separation zone. An embodiment of the invention is one, any or all of prior embodiments in this paragraph up through the first embodiment in this paragraph wherein the first separation zone and the second separation zone are each contained within different vessels. An embodiment of the invention is one, any or all of prior embodiments in this paragraph up through the first embodiment in this paragraph wherein the first separation zone and the second separation zone are each contained within the vessel and wherein the vessel comprises a wall fluidically separating the first separation zone and the second separation zone. An embodiment of the invention is one, any or all of prior embodiments in this paragraph up through the first embodiment in this paragraph wherein the second separation zone is heated with a reboiler. An embodiment of the invention is one, any or all of prior embodiments in this paragraph up through the first embodiment in this paragraph wherein the first separation zone receives a stripping gas, the stripping gas comprising steam.

A second embodiment of the invention is a process for separating effluent streams from different reaction zones, the process comprising passing at least a portion of a first liquid effluent stream from a first reaction zone to a first separation zone, the portion of the first liquid effluent stream comprising a diesel hydrotreated effluent; passing at least a second portion of a second liquid effluent stream from a second reaction zone to a second separation zone, the portion of the second liquid effluent stream comprising a naphtha hydrotreated effluent; separating the first liquid effluent stream in the first separation zone into an overhead stream and a bottoms stream; separating the second liquid effluent stream in the second separation zone into an overhead stream and a bottoms stream; passing both the overhead stream from the second separation zone and the overhead stream from the first separation zone to a combined overhead condenser; and, passing a condensed overhead stream from the combined overhead condenser to a combined overhead receiver. An embodiment of the invention is one, any or all of prior embodiments in this paragraph up through the second embodiment in this paragraph further comprising passing a reflux stream from the overhead receiver to the second separation zone. An embodiment of the invention is one, any or all of prior embodiments in this paragraph up through the second embodiment in this paragraph further comprising passing a steam stream into the first separation zone. An embodiment of the invention is one, any or all of prior embodiments in this paragraph up through the second embodiment in this paragraph further comprising passing the bottoms stream from the first separation zone to a drying zone configured to provide a diesel product stream. An embodiment of the invention is one, any or all of prior embodiments in this paragraph up through the second embodiment in this paragraph further comprising passing a stream from the second separation zone to the first separation zone as a reflux stream. An embodiment of the invention is one, any or all of prior embodiments in this paragraph up through the second embodiment in this paragraph wherein the first separation zone and the second separation zone are each contained within different vessels. An embodiment of the invention is one, any or all of prior embodiments in this paragraph up through the second embodiment in this paragraph wherein the first separation zone and the second separation zone are each contained within the vessel and wherein the vessel comprises a wall fluidically separating the first separation zone and the second separation zone.

A third embodiment of the invention is a process for separating effluent streams from different reaction zones, the process comprising passing at least a portion of a first liquid effluent stream from a first reaction zone to a first separation zone, the portion of the first liquid effluent stream comprising a diesel hydrotreated effluent; passing at least a second portion of a second liquid effluent stream from a second reaction zone to a second separation zone, the portion of the second liquid effluent stream comprising a naphtha hydrotreated effluent; separating the portion of a first effluent stream in the first separation zone into an overhead stream and a bottoms stream; separating the portion of a second effluent stream in the second separation zone into an overhead stream and a bottoms stream; passing both the overhead stream from the second separation zone and the overhead stream from the first separation zone to a combined overhead receiver; and, passing a reflux stream from the second separation zone to the first separation zone. An embodiment of the invention is one, any or all of prior embodiments in this paragraph up through the third embodiment in this paragraph wherein the second separation zone is heated with a reboiler. An embodiment of the invention is one, any or all of prior embodiments in this paragraph up through the third embodiment in this paragraph further comprising passing a steam stream into the first separation zone. An embodiment of the invention is one, all or any of embodiments in this paragraph wherein the first separation zone comprises a stripping column and wherein the second separation zone comprises a stripping column. An embodiment of the invention is one, all or any of embodiments in this paragraph further comprising passing the naphtha hydrotreated effluent to a naphtha splitter or a reforming reactor, wherein the naphtha hydrotreated effluent does not pass through any other fractionation when passed from the stripper and to the naphtha splitter or the reforming reactor. An embodiment of the invention is one, all or any of embodiments in this paragraph wherein the diesel hydrotreated effluent is capable of being passed to a blending pool without further fractionation.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for separating effluent streams from different reaction zones, the process comprising:
   passing at least a portion of a first liquid effluent stream from a first reaction zone to a first separation zone;
   passing at least a second portion of a second liquid effluent stream from a second reaction zone to a second separation zone, the second reaction zone being different than the first reaction zone;
   separating the portion of a first effluent stream in the first separation zone into an overhead stream and a bottoms stream;
   separating the portion of a second effluent stream in the second separation zone into an overhead stream and a bottoms stream;
   passing both the overhead stream from the second separation zone and the overhead stream from the first separation zone to a combined overhead receiver; and,
   providing a reflux stream for at least the second separation zone from the combined overhead receiver;
   wherein the first separation zone and the second separation zone are each contained within a single vessel and wherein the single vessel comprises a wall fluidically separating the first separation zone and the second separation zone.

2. The process of claim 1 wherein the bottoms stream from the first separation zone comprises a diesel stream.

3. The process of claim 2 further comprising:
   passing both the overhead stream from the second separation zone and the overhead stream from the first separation zone to a combined overhead condenser.

4. The process of claim 3 wherein the first separation zone receives a stripping gas stream.

5. The process of claim 1 wherein the first reaction zone comprises a diesel hydrotreating zone, and wherein the second reaction zone comprises a naphtha hydrotreating zone.

6. The process of claim 5 further comprising:
   passing a reflux stream from the second separation zone to the first separation zone.

7. The process of claim 6 wherein the second separation zone is heated with a reboiler.

8. The process of claim 7 wherein the first separation zone receives a stripping gas, the stripping gas comprising steam.

* * * * *